United States Patent
Ji et al.

(10) Patent No.: US 9,496,999 B2
(45) Date of Patent: Nov. 15, 2016

(54) METHOD AND APPARATUS FOR RESOURCE ALLOCATION IN MULTI-CARRIER WIRELESS SYSTEM

(71) Applicant: Samsung Electronics Co., Ltd., Gyeonggi-do (KR)

(72) Inventors: Hyoungju Ji, Seoul (KR); Youngbum Kim, Seoul (KR);
(Continued)

(73) Assignee: Samsung Electronics Co., Ltd (KR)

( * ) Notice: Subject to any disclaimer, the term of this patent is extended or adjusted under 35 U.S.C. 154(b) by 145 days.

(21) Appl. No.: 13/669,007

(22) Filed: Nov. 5, 2012

(65) Prior Publication Data
US 2013/0114533 A1 May 9, 2013

(30) Foreign Application Priority Data

Nov. 4, 2011 (KR) ........................ 10-2011-0114682

(51) Int. Cl.
*H04W 4/00* (2009.01)
*H04L 5/00* (2006.01)
*H04W 72/12* (2009.01)

(52) U.S. Cl.
CPC ........... *H04L 5/0044* (2013.01); *H04L 5/0064* (2013.01); *H04W 4/005* (2013.01);
(Continued)

(58) Field of Classification Search
CPC ................. H04W 88/02; H04W 74/04; H04W 48/12; H04W 72/1289; H04W 24/10; H04W 4/005
(Continued)

(56) References Cited

U.S. PATENT DOCUMENTS 8,521,881 B2 * 8/2013 Awad et al. .................. 709/226
8,687,584 B2 * 4/2014 Yang et al. ................... 370/329
(Continued)

FOREIGN PATENT DOCUMENTS

| KR | 1020110093581 | 8/2011 |
|---|---|---|
| KR | 1020110093582 | 8/2011 |
| WO | WO 2011/116849 | 9/2011 |

OTHER PUBLICATIONS

3rd Generation Partnership Project; Technical Specification Group Services and System Aspects; System Improvements for Machine-Type Communications; (Release 11), 3GPP TR 23.888 V1.5.0, Oct. 2011.
(Continued)

*Primary Examiner* — Dang Ton
*Assistant Examiner* — Abdeltif Ajid
(74) *Attorney, Agent, or Firm* — The Farrell Law Firm, P.C.

(57) ABSTRACT

A method and apparatus for resource allocation in a multi-carrier wireless communication system enables transmission using smaller resource units and achieves efficient transmission of data channels with very low data rates, scheduling a greater number of user equipments without additional control channel overhead while maintaining compatibility with the resource allocation scheme of legacy user equipments. Thus, one cell controls a larger number of user equipments. In addition, as multiple user equipments are scheduled using a single control channel, resource efficiency is increased.

16 Claims, 11 Drawing Sheets

(72) Inventors: Joonyoung Cho, Gyeonggi-do (KR);
Seunghoon Choi, Gyeonggi-do (KR)

(52) U.S. Cl.
CPC ........ *H04W 72/1263* (2013.01); *H04L 5/0007* (2013.01); *H04L 5/0051* (2013.01); *H04L 5/0094* (2013.01); *H04W 4/008* (2013.01)

(58) Field of Classification Search
USPC .................................................. 370/328, 329
See application file for complete search history.

(56) References Cited

U.S. PATENT DOCUMENTS

| | | | |
|---|---|---|---|
| 2009/0268693 A1* | 10/2009 | Lindh et al. .................. | 370/336 |
| 2010/0027446 A1* | 2/2010 | Choi ..................... | H04L 5/0053 370/280 |
| 2011/0194511 A1* | 8/2011 | Chen ................... | H04W 72/121 370/329 |
| 2012/0282956 A1 | 11/2012 | Kim et al. | |
| 2014/0328295 A1* | 11/2014 | Ko et al. ....................... | 370/329 |

OTHER PUBLICATIONS

3rd Generation Partnership Project; Technical Specification Group Services and System Aspects; Service Requirements for Machine-Type Communications (MTC), Stage 1 (Release 11), 3GPP TS 22.368 V11.3.0, Sep. 2011.

\* cited by examiner

FIG. 5
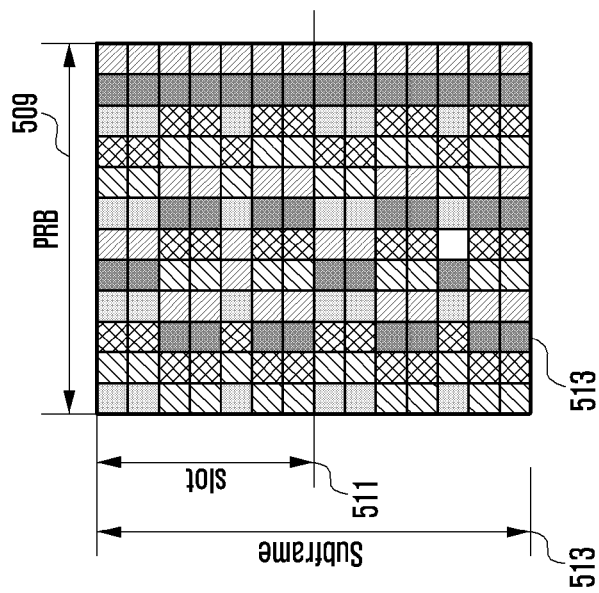
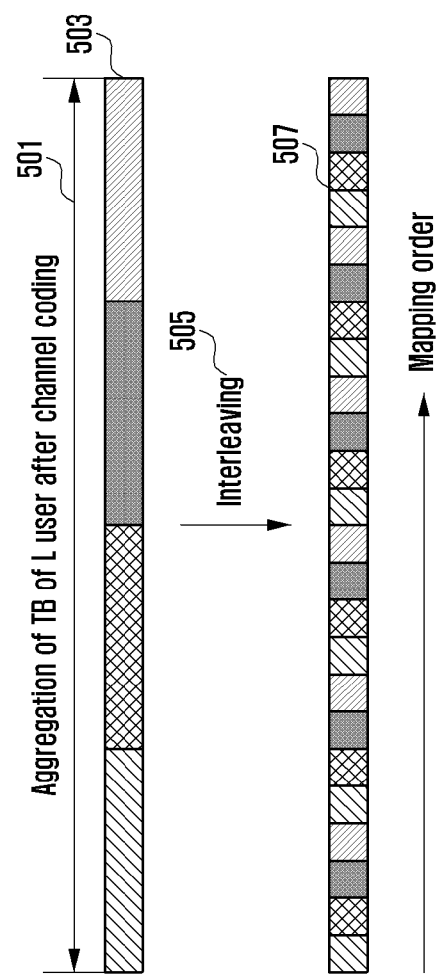

METHOD AND APPARATUS FOR RESOURCE ALLOCATION IN MULTI-CARRIER WIRELESS SYSTEM

PRIORITY

This application claims priority under 35 U.S.C. §119(a) to a Korean patent application filed on Nov. 4, 2011 in the Korean Intellectual Property Office and assigned Serial No. 10-2011-0114682, the entire content of which is incorporated herein by reference.

BACKGROUND OF THE INVENTION

1. Field of the Invention

The present invention relates generally to a wireless communication system and, more particularly, to a method and apparatus for data channel resource allocation in a multi-carrier wireless system.

2. Description of the Related Art

Recently, Machine-to-Machine/Internet Of Things (M2M/IoT) services, in which various nearby things are connected together through networks to enable easy acquisition and transfer of information at any time and place, have become a key issue for next generation communication markets. At first, sensor and Radio-Frequency IDentification (RFID) networks mainly targeting local regions have been used for M2M communication. Later, as purposes and characteristics of applications diversified, various other wired/wireless networks have been used for M2M communication. In recent years, M2M communication based on mobile communication networks has attracted attention in consideration of mobility of things, broad service areas covering islands, mountains and seas, ease of network operation and maintenance, security for highly reliable data transmission, and quality of service guarantees. In M2M communication, mainly small data packets are transmitted and the transmission period tends to be very long. As the number of terminals or devices in a cell reaches about 30,000, a base station, which normally handles several hundreds of terminals, may now have to double the number of terminals to handle.

Along with this trend, 3rd Generation Partnership Project (3GPP), a representative European standardization body for mobile communication, conducted a feasibility study on M2M communication in 2005, and has been actively engaged in M2M standardization since 2008 under the name of Machine Type Communications (MTC).

In addition to M2M equipment, regular user equipment having various applications may execute a background application that periodically or non-periodically exchanges very small amounts of data with a corresponding application server. In this case, the user equipment transmits very small packets. As most systems have been designed to efficiently transfer large amounts of data, transmission of small data packets causes degradation of frequency efficiency. Hence, it is necessary to develop a new transmission scheme that can accommodate a large number of user equipments transmitting small data packets based on existing systems.

SUMMARY OF THE INVENTION

Accordingly, the present invention has been made in view of the above problems and/or disadvantages and the present invention provides a method and apparatus that can schedule multiple User Equipments (UEs) requiring low data rates while maintaining compatibility with data channel configurations of legacy user equipments.

More specifically, the present invention provides a method and apparatus that multiplexes multiple UEs using a single resource and schedules multiple user equipments using a single control channel.

According to an aspect of the present invention, one resource group is divided into L number of resources for transmission in a multi-carrier system. In the downlink, data packets from L UEs are aggregated, interleaved, and then mapped to a data channel. In the uplink, the bandwidth of the uplink data channel is narrower than that of an uplink reference signal. UEs using the same resource group use a reference signal cyclic-shifted by different values and occupy different frequency ranges. In the uplink, data is sent using a format ensuring orthogonality between the data channel and reference signal according to characteristics of the data. The control channel sends data originating from a group of UEs. UEs in the same group receive the same control channel using a group Radio Network Temporary Identifier (RNTI) and group Cyclic Redundancy Check (CRC) masking, send actual scheduling through higher layer signaling, and are activated or deactivated for transmission using group CRC.

According to an aspect of the present invention, there is provided a downlink resource allocation method for an Evolved Node B base station (eNB) supporting multiple User Equipments (UE) in a wireless communication system, including transmitting configuration information, which contains a group identifier of a group to which a UE belongs and location information of a mini-PRB allocated to the group in a PRB divided into at least two mini-PRBs, to the UE, transmitting a control channel, which carries downlink resource allocation information for at least two UEs in a PRB, to the UE, and transmitting a data channel, which is configured according to the downlink resource allocation information, to the UE.

According to another aspect of the present invention, there is provided a method of receiving resource allocation information for a User Equipment (UE) in a wireless communication system, including receiving configuration information, which contains a group identifier of a group to which the UE belongs and location information of a mini-PRB allocated to the group in a PRB divided into at least two mini-PRBs, from an Evolved Node B base station (eNB), receiving a control channel, which carries downlink resource allocation information for the group in a PRB, from the eNB, and receiving a data channel, which is configured according to the downlink resource allocation information, from the eNB.

According to another aspect of the present invention, there is provided an Evolved Node B base station (eNB) for allocating resources to multiple User Equipments (UE) in a wireless communication system, including a transceiver configured to send and receive signals to and from a UE, and a controller configured to control transmitting configuration information, which contains a group identifier of a group to which a UE belongs and location information of a mini-PRB allocated to the group in a PRB divided into at least two mini-PRBs, to the UE, transmitting a control channel, which carries downlink resource allocation information for at least two UEs in a PRB, to the UE, and transmitting a data channel, which is configured according to the downlink resource allocation information, to the UE.

According to another aspect of the present invention, there is provided a User Equipment (UE) for receiving resource allocation information in a wireless communication system, including a transceiver configured to send and receive signals to and from an Evolved Node B base station (eNB), and a controller configured to control receiving configuration information, which contains a group identifier of a group to which the UE belongs and location information of a mini-PRB allocated to the group in a PRB divided into at least two mini-PRBs, from the eNB, receiving a control channel, which carries downlink resource allocation information for the group in a PRB, from the eNB, and receiving a data channel, which is configured according to the downlink resource allocation information, from the eNB.

BRIEF DESCRIPTION OF THE DRAWINGS

The above and other aspects, features and advantages of the present invention will be more apparent from the following detailed description taken in conjunction with the accompanying drawings, in which:

FIG. 5 is a diagram illustrating resource allocation according to an embodiment of the present invention;

DETAILED DESCRIPTION OF THE EMBODIMENTS OF THE PRESENT INVENTION

Various embodiments of the present invention are described in detail with reference to the accompanying drawings. The same reference symbols are used throughout the drawings to refer to the same or like components. Detailed descriptions of well-known functions and structures are omitted to avoid obscuring the subject matter of the present invention. Specific terms are defined in the following description and the meaning of specific terms or words used is not intended to limit aspects of the present invention.

The following description focuses on Long Term Evolution (LTE) and LTE-Advanced systems. However, the present invention is also applicable to other wireless communication systems supporting base station scheduling.

Figure 1:
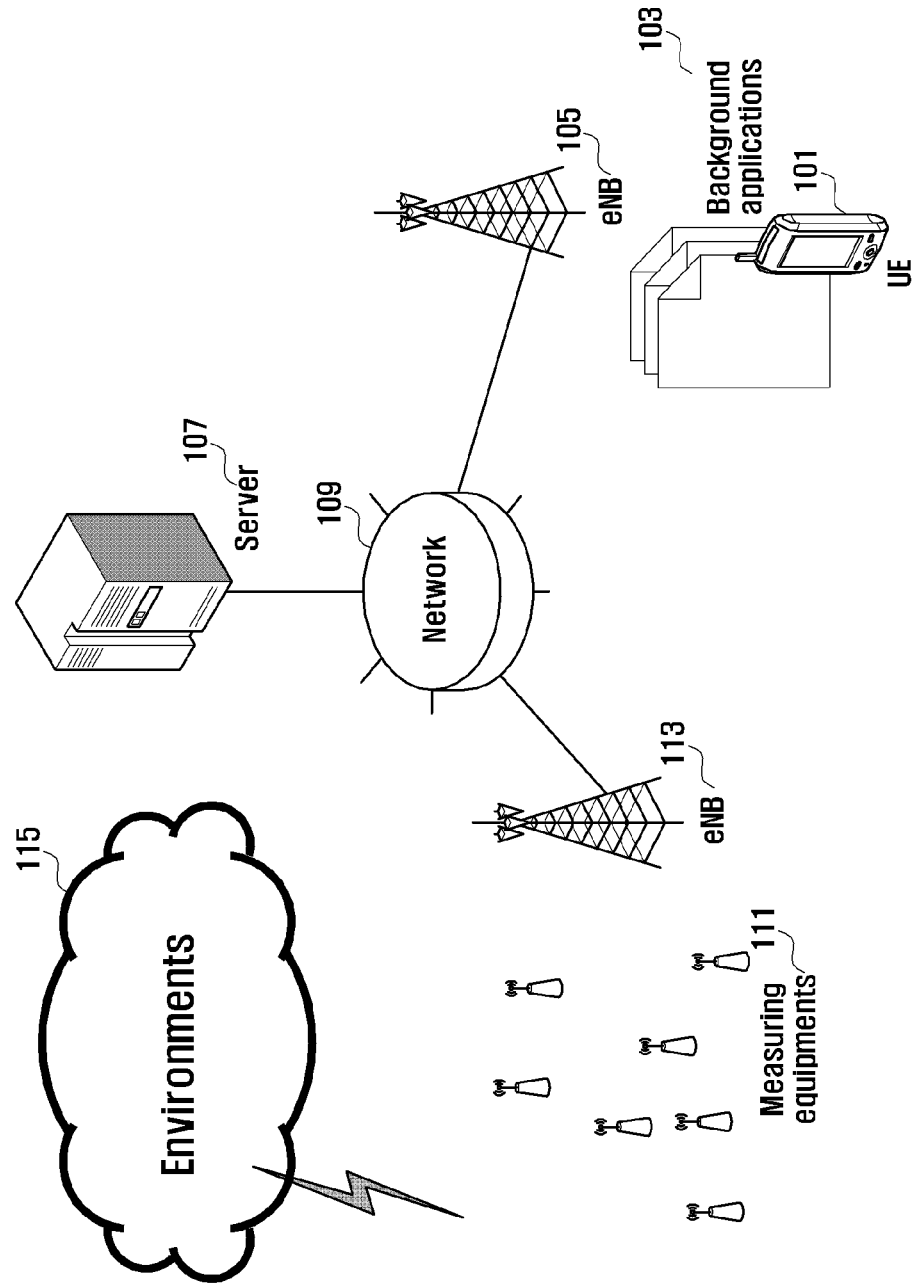
FIG. 1 is a diagram illustrating environments of a wireless communication system, according to an embodiment of the present invention.

FIG. 1 is a diagram illustrating a system, according to an embodiment of the present invention.

In FIG. 1, a UE (user equipment) 101 or 111 sends data to another UE. Voice data is a representative data exchanged between UEs. The UE 101 or 111 also sends data to a server 107. That is, the UE 101 or 111 communicates with the server 107. The server 107 is a final or intermediate destination of data sent by the UE 101 or 111. Data sent by the UE 101 or 111 is routed via a wireless network to the server 107. The server 107 and eNBs 113 and 105 are connected through a network 109, which is a wired network. The eNB 113 or 105 receives data from the UE 101 or 111, and forwards the received data through the network 109 to the server 107.

In FIG. 1, UEs 111 are MTC devices that perform measurement on environments 115 or facilities and report measurement results. MTC devices are used in various ways for environmental measurement, traffic information transmission, indoor or outdoor advertisement, home electronics, and vending machines. Facilities or instruments that have MTC devices and do not use wired connections are deployed or installed without regard to places.

In FIG. 1, the UE 101 is a UE capable of executing various applications. With advances in communication technology, some applications provide continuous services such as messaging or location tracking. Such an application unceasingly sends and receives small amounts of data to and from a corresponding server even when the user does not require data and does not use the service. An application of this type is referred to as a background application. Data generated by a background application 103 is sent to the server 107 providing desired services.

Unlike a typical UE, the MTC UE 111 and UE 101 running a background application shown in FIG. 1 generates small amounts of data and send data with a long period.

Most wireless communication systems, which have been designed for high data transfer rates, divide and allocate resources in such a way as to achieve high data transfer rates. However, use of an existing transmission scheme to transmit small amounts of data as illustrated in FIG. 1 or to handle a large number of MTC devices present in one cell (unlike legacy UEs, tens of thousands of MTC devices are present in a cell) may cause a problem in terms of resource efficiency or control channel capacity.

Figure 2:
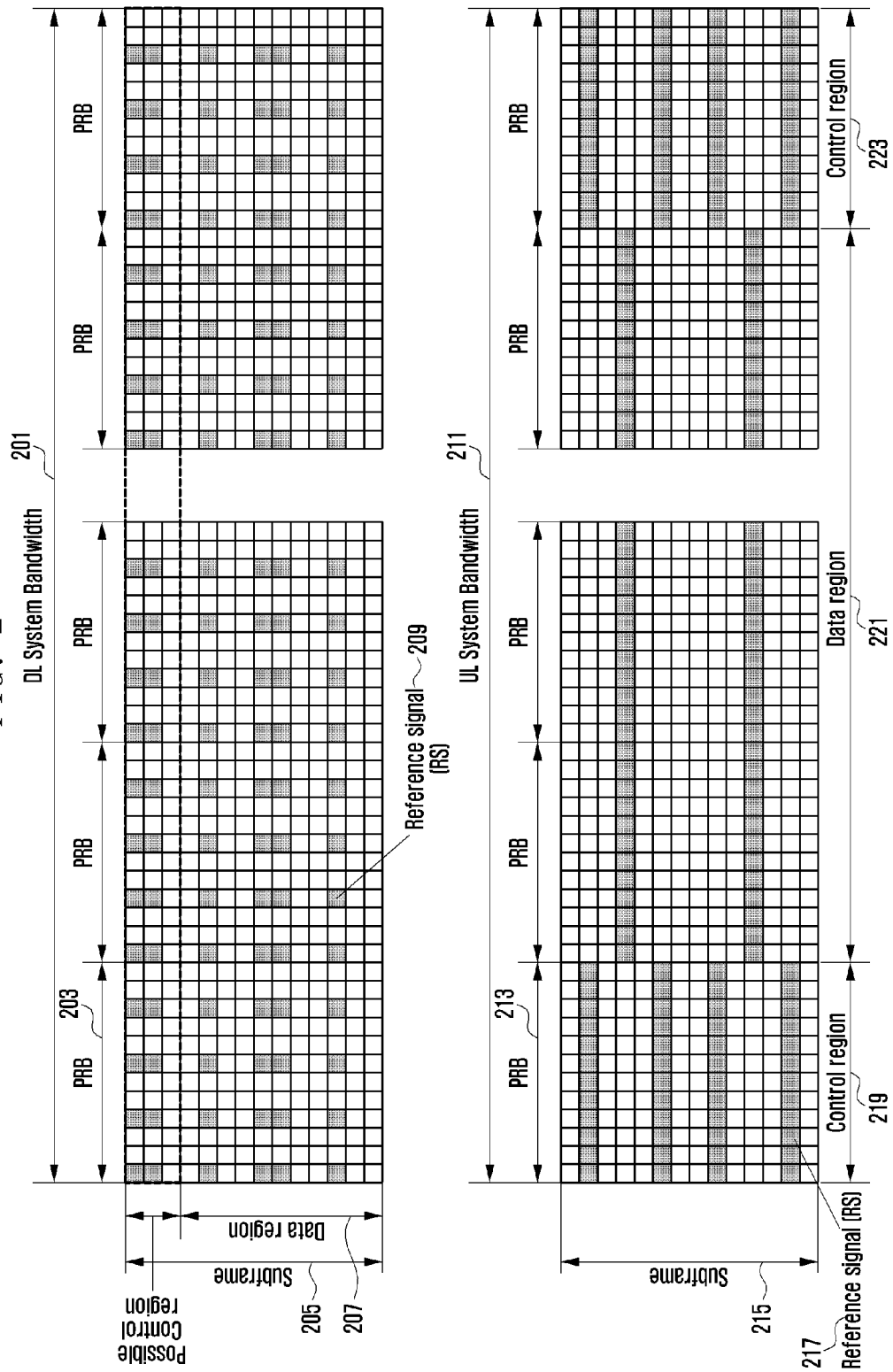
FIG. 2 is a diagram illustrating downlink and uplink frame structures in an Orthogonal Frequency-Division Multiplexing (OFDM) system, according to an embodiment of the present invention.

FIG. 2 is a diagram illustrating downlink and uplink frame structures in an LTE system.

Referring to FIG. 2, the system bandwidth 201 or 211 is composed of multiple Physical Resource Blocks (PRB), and each PRB 203 or 213 consists of twelve tones in the frequency domain and fourteen or twelve Orthogonal Frequency-Division Multiplexing (OFDM) symbols in the time domain. A basic unit of resource allocation is one PRB. A subframe 205 or 215 is 1 ms long and is divided into two 0.5 ms slots. This applies equally to the uplink and the downlink configurations.

A downlink Reference Signal (RS) 209 is a pre-agreed signal that is sent by the eNB so that the UE performs channel estimation. In the LTE system, a reference signal is a Common Reference Signal (CRS) or a Dedicated Reference Signal (DRS). For an eNB using two antenna ports, CRSs 209 correspond to antenna ports 0 and 1, and for an eNB using four antenna ports, CRSs 209 correspond to antenna ports 0, 1, 2 and 3. When the number of antenna ports is greater than or equal to one, this indicates that the eNB uses multi-antenna transmission. In the frequency domain, absolute positions of PRBs where reference signals are arranged are different for different cells, but intervals between reference signals are kept constant. That is, reference signals of the same antenna port are separated by 6 PRBs. The reason why reference signals have different absolute positions for different cells is to avoid inter-cell conflicts between reference signals. The number of reference signals is different for different ports. For antenna ports 0 and 1, there are eight reference signals in one PRB and subframe, and for antenna ports 2 and 3, there are four reference signals in one PRB and subframe.

As common reference signals are to be received by all UEs, they are equally applied to all PRBs in the downlink. An uplink reference signal 217 is a pre-agreed signal that is sent by the UE so that the eNB performs channel estimation. Uplink reference signals are differently arranged for different channels. Reference signals in the control region 219 or 223 are different from those in the data region 221 in terms of temporal position and number per subframe. In general, a greater number of reference signals are present in the control region. This indicates that control channels are more important than data channels for adequate UE operation. Presence of multiple antenna ports in the downlink indicates that the corresponding eNB employs Multiple-Input Multiple-Output (MIMO) transmission to send a larger amount of data.

In the LTE downlink, control channel signals are transmitted through multiple physical channels allocated at the fore part of a subframe. Control channel signals are present in a region indicated by reference signal 209 in FIG. 2. A control channel signal is transmitted during the time of L OFDM symbols at the fore part of a subframe. The control region occupies one symbol, two or three symbols. As the control region is allocated at the fore part of a subframe, the UE receives a control channel signal early and determine early whether a data channel signal addressed thereto is transmitted. Hence, when a data channel signal addressed thereto is not transmitted, the UE skips reception of a data channel signal, reducing power consumption in data reception. Additionally, earlier reception of a control channel signal than a data channel signal contributes to reduction of scheduling delay.

In the LTE uplink, control regions 219 and 223 are arranged in PRBs at two ends of the system bandwidth 211. This is to achieve maximum frequency diversity. Scheduling information such as resource allocation information and Modulation and Coding Scheme (MCS) information is transmitted through a control channel. Resource allocation information for data includes information indicating a PRB, and MCS information indicates the size of data carried through the PRB. In an uplink, cyclic shift information for a reference signal is further included. When UEs send to the eNB through the same resources in the uplink, different cyclic shift values are assigned to the UEs using the same resources and the eNB separates channels for each UE.

The eNB sends scheduling information containing uplink control channel information so that the UE performs control channel transmission in the uplink. The UE uses different control channels based on the uplink control channel information. There are basically three uplink control channel formats: format 1 for a control channel of 1-2 bits, format 2 for a control channel of up to 10 bits, and format 3 for a control channel of up to 24 bits. Reference signals and resources are differently configured in control channels with different formats.

Multi-carrier systems including the LTE system have been designed to achieve a higher data transfer rate. Hence, schemes for resource allocation and data transmission are optimized for transmitting a large amount of data at a high speed. However, for a UE requiring a low data rate as illustrated in FIG. 1, a maximum data rate of 120 kbps in the downlink and a maximum data rate of 60 kbps in the uplink may suffice. Such a UE requiring a low data rate may not accord with objectives of the LTE system using the unit of PRB. In addition, 20,000-30,000 MTC UEs are present in one cell. When utilizing a PRB as a scheduling unit, it is impossible to simultaneously schedule such a large number of MTC UEs. Further, as an MTC UE is a low cost device supporting a narrow bandwidth, it is necessary for the system capable of supporting a wider bandwidth to operate at a narrow bandwidth. Use of a narrow bandwidth allows use of low cost components. For MTC UEs supporting low data rates, wideband data transmission is not necessary.

Figure 3:
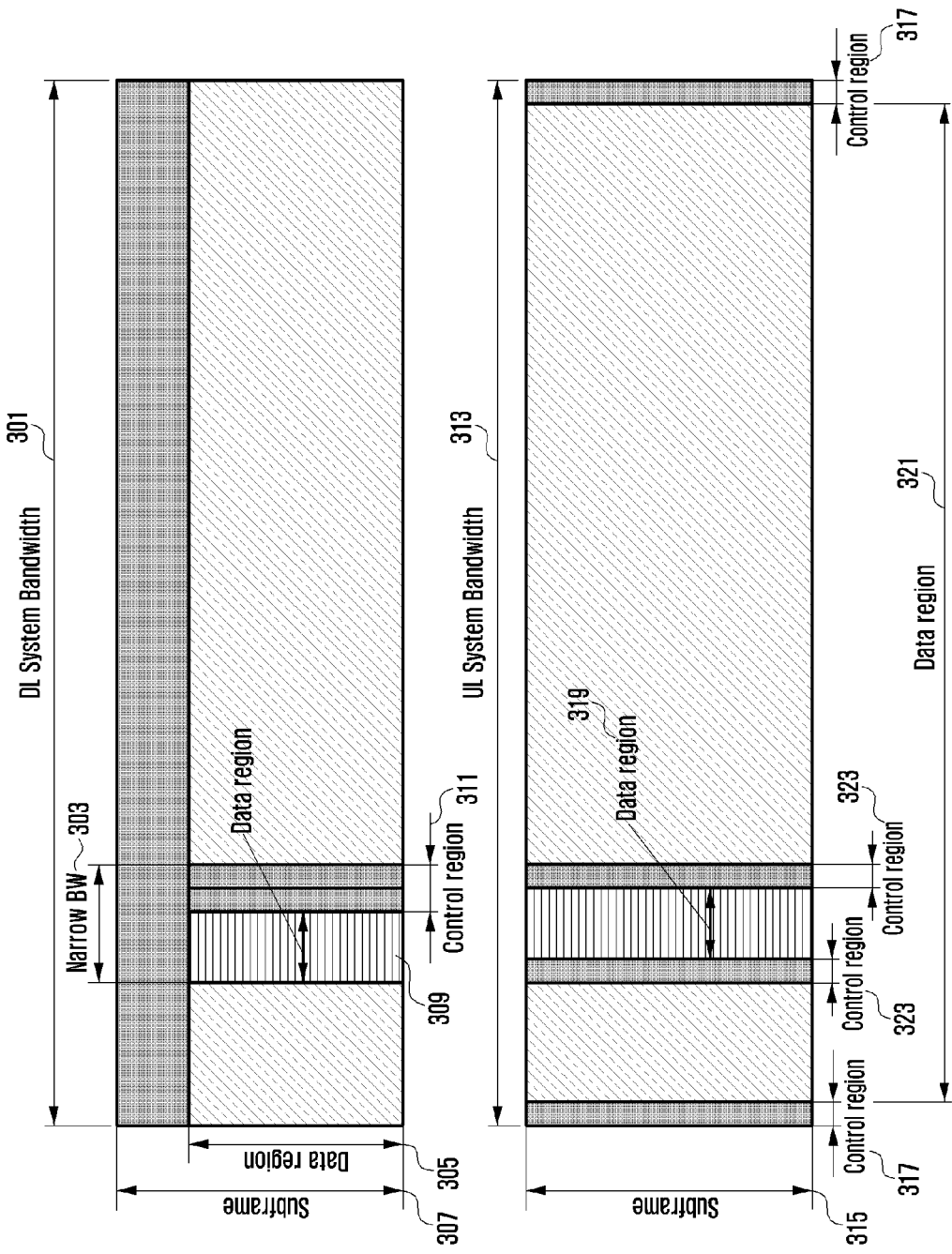
FIG. 3 is a diagram illustrating an overview of data channels in an OFDM system, according to an embodiment of the present invention.

FIG. 3 is a diagram illustrating subframe structures that can be used when UEs operate at a lower bandwidth than the system bandwidth.

In FIG. 3, reference numerals 301 and 313 indicate the downlink system bandwidth and the uplink system bandwidth in the LTE system, respectively. A UE using a narrow bandwidth like an MTC device operates at a narrow bandwidth 303 in a PRB of the system bandwidth 301 or 313. Here, the UE receives only a region defined by the bandwidth 303 in the frequency domain and reference numeral 305 in the time domain. To decode control channels, the whole control region is to be received. However, an MTC UE receiving only a part of the control region cannot decode control channels. For the MTC UE, two control regions 311 and a data region 309 is defined within the bandwidth 303. For example, when the MTC UE supports a bandwidth of 1.4 MHz, the bandwidth 303 corresponds to six PRBs: 2 PRBs for the control region and 4 PRBs for the data region. For the existing system where one PRB can be used to carry data of only one UE, 4 PRBs may carry data for four UEs, and carry data for eight UEs when spatial multiplexing is used.

As spatial multiplexing is not applicable depending upon channel conditions, 4 PRBs may carry data for only up to four UEs. To schedule many UEs supporting a narrow bandwidth, it is necessary to decrease the size of a resource allocation unit without affecting scheduling of other UEs and with a minimum increase in the control region. When the control region (for control channels) is enlarged, resources to carry actual data are reduced.

In the uplink system bandwidth 313, a narrow bandwidth corresponding to the bandwidth 303 is provided. In this narrow bandwidth, two control regions 323 and a data region 319 are defined. A UE supporting the wider bandwidth 313 performs data channel transmission at a data region 317 and performs control channel transmission at control regions 321. On the other hand, a UE supporting a narrow bandwidth like an MTC device performs control channel transmission at the control regions 323 and performs data channel transmission at the data region 319. When the control regions 323 occupy 2 PRBs, the data region 319 occupies 4 PRBs. At most eight UEs are scheduled using 4 PRBs even when spatial multiplexing is employed. To schedule more UEs, it is necessary to use a smaller scheduling unit in both the downlink and the uplink.

Figure 4:
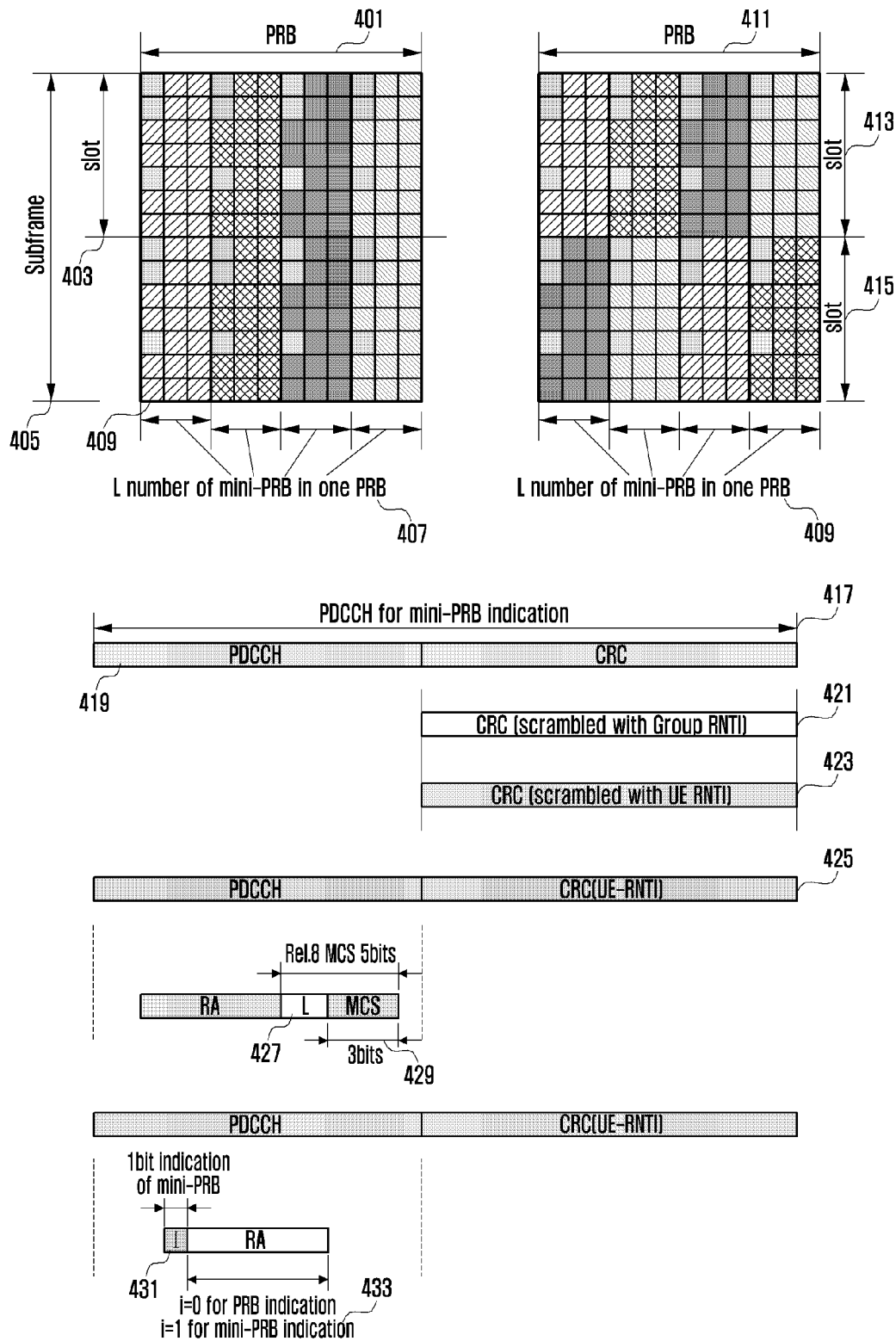
FIG. 4 is a diagram illustrating a downlink resource allocation structure and control channel according to an embodiment of the present invention.

FIG. 4 is a diagram illustrating a resource allocation scheme for the LTE system according to an embodiment of the present invention.

In the scheme described herein, multiple UEs use the resource of one PRB in an orthogonal way and data of the multiple UEs is multiplexed for transmission. Referring to FIG. 4, one PRB 401 consisting of 12 subcarriers and 14 symbols is divided into L mini-PRBs and the mini-PRBs are individually allocated. The eNB notifies the value of L to UEs through higher layer signaling such as Radio Resource Control (RRC) signaling.

Division of one PRB into L mini-PRBs indicates division in the frequency domain as indicated by reference numeral 401 or division in both the frequency domain and the time domain as indicated by reference numeral 411. This means division of available resources in a PRB into L parts.

L is an integer greater than or equal to 2, and is preferably set to 2 or 4 in consideration of the number and locations of reference signals. In FIG. 4, L is set to 4. For resource allocation using mini-PRBs, the eNB has to send resource allocation information based on mini-PRBs to individual UEs. Mini-PRBs are defined by division in the frequency domain and in the time domain as indicated by reference numeral 411. For example, as indicated by reference numeral 411, L mini-PRBs are arranged over two slots 413 and 415 constituting one subframe 405. According to an aspect of the present invention, allocation is performed not only on a slot basis but also on a symbol basis. Use of a control channel is necessary to notify resource allocation information involving mini-PRBs to UEs. A control channel configuration for notifying UEs of resource allocation using mini-PRBs is described below.

Reference numeral 411 indicates a control channel configuration for mini-PRB allocation. In the LTE system, control channel transmission consists of Physical Downlink Control CHannel (PDCCH) payload indicated by reference numeral 419 and Cyclic Redundancy Check (CRC) value indicated by reference numeral 421. In the existing system, CRC 421 is scrambled with UE—Radio Network Temporary Identifier (RNTI) as indicated by reference numeral 425 and transmitted to UEs. Each UE performs CRC test on all control channel candidates with a unique identifier and regards a control channel passing the CRC test as a control channel assigned thereto. Hence, in a related art technique, scheduling multiple UEs at once requires transmission of a larger number of control channels to UEs.

According to an embodiment of the present invention, providing more efficient control channel transmission, multiple UEs are grouped, one control channel is assigned to one group of UEs, and a UE identifies the control channel assigned to the group with a group RNTI. As indicated by reference numeral 423, PDCCH CRC is scrambled with a group RNTI and the group RNTI is notified to UEs in the corresponding group.

In the above scheme, it is possible for one control channel to simultaneously activate all UEs in the corresponding group for transmission and reception. To achieve this, all UEs receive in advance at least one of information on a subframe to receive, resource allocation information, and code rate information from the eNB through higher layer signaling. Here, the resource allocation information contains mini-PRB information. A UE receives a unique ID and a group ID from the eNB through higher layer signaling, performs CRC test on control channels with the group ID, and regards the control channel passing the CRC test as a control channel carrying resource allocation information for data to be received from the eNB. Although multiple UEs with the same group ID are activated, as different subframe locations and mini-PRB locations are allocated thereto by the eNB, the UEs receive intended data without conflict. When using a group ID to activate data reception, there is no need to increase the number of control channels for scheduling a large number of MTC UEs. For example, assuming that 40 UEs supporting a 20 MHz bandwidth and 20,000 MTC UEs supporting a 1.4 MHz bandwidth are present in a cell and a subframe accommodates control channels for up to eight UEs, when an existing scheme is used, 7 UEs and 1 MTC UE are scheduled. When using the scheme described above, when 7 UEs and all MTC UEs are in the same group, it is possible to simultaneously schedule 20,000 MTC UEs. Groups are formed according to characteristics or services of MTC UEs. For example, one group with a first group ID is formed by MTC UEs whose transmission periods are very long, and another group with a second group ID is formed by MTC UEs whose transmission periods are short. Groups may also be formed according to locations of UEs. Group IDs are specified using RNTI values. In this case, PDCCH CRC is scrambled with an RNTI used as a group ID.

According to an embodiment of the present invention, providing efficient control channel transmission, existing LTE Semi-Persistent Scheduling (SPS) is used for resource allocation.

In SPS, a UE receives timing information of a subframe to receive through higher layer signaling from the eNB, receives PRB resource allocation information through a control channel, and is activated. After initial reception of the resource allocation information, the UE receives data using the same PRB at regular intervals.

To apply SPS to mini-PRBs, the eNB notifies a subframe reception time for SPS and a value of L to the UE. For example, when L is set to 4, the eNB notifies one of 0 to 3 to the UE. The eNB notifies a PRB index for SPS through the control channel to the UE, and the UE uses the L value received through higher layer signaling to identify a mini-PRB assigned thereto in the PRB indicated through the control channel. In other words, the PRB containing mini-PRBs is notified through the control channel and the mini-PRB within the PRB is notified through higher layer signaling. As an advantage in this case, the UE receives data using mini-PRB information indicated through higher layer signaling and existing SPS without control channel enhancement or modification. To schedule more UEs, it is necessary to use longer SPS periods.

According to an embodiment of the present invention, providing efficient control channel transmission, resource allocation information and MCS information of the existing control channel are used. The control channel carries resource allocation information containing a PRB index for data channel reception and 5-bit MCS information indicating the code rate. For an MTC UE, a high code rate such as 64-Quadrature Amplitude Modulation (QAM) is not necessary. An MTC UE sends small amounts of data and is a low-cost device unsuitable for complex processing. Using 64-QAM requiring high-performance channel estimation is expensive and is not adequate for MTC UEs. In consideration of these, referring to FIG. 4, among 5 bits of the MCS field, lower 3 bits are used to carry MCS information as indicated by reference numeral 429 and higher 2 bits are used to carry mini-PRB information as indicated by reference numeral 427. Here, L is assumed to be 4. As the payload size of the existing control channel is not changed, UE modification is not necessary, and other problem due to the control channel size does not occur. When the control channel size is changed, a UE may fail in control channel decoding without prior notification. This is because location of control information is dependent on the size of the control channel. In addition to reduction of the MCS field to 3 bits, it is necessary to specify the Transport Block Size (TBS) in mini-PRBs to determine the TBS in unit of existing PRBs. This is illustrated in Table 1.

TABLE 1

TBS for mini-PRBs

| TBS index | L = 4 | L = 3 | L = 2 | 1 |
|---|---|---|---|---|
| 0 | 4 | 6 | 8 | 16 |
| 1 | 6 | 8 | 12 | 24 |
| 2 | 8 | 12 | 16 | 32 |
| 3 | 12 | 16 | 24 | 40 |
| 4 | 16 | 24 | 32 | 56 |
| 5 | 24 | 32 | 40 | 72 |
| 6 | 43 | 40 | 56 | 328 |
| 7 | 40 | 56 | 72 | 104 |

According to an embodiment of the present invention, providing efficient control channel transmission, a new indicator is added to the resource allocation information. A 1-bit indicator 431 indicates whether the resource allocation information is in units of PRB or in units of mini-PRB. When the 1-bit indicator 431 is 0, the resource allocation information is in units of PRB, and when the 1-bit indicator 431 is 1, the resource allocation information is in units of mini-PRB. In this scheme, as it is not necessary to notify a UE of mini-PRB information through higher layer signaling, higher layer signaling is not changed. However, as the payload size of the control channel is changed, it is necessary to notify use of mini-PRBs to a UE.

FIG. 5 is a diagram illustrating division of one PRB into L mini-PRBs and multiplexing L mini-PRBs into one PRB. The eNB performs resource allocation by regarding mini-PRBs as separate resources like PRBs as illustrated in FIG. 4, and by assigning aggregated data to one PRB as illustrated in FIG. 5.

As indicated by reference numeral 501, the eNB may aggregate pieces of data for L UEs, where sizes of data pieces are identical or different. For comparable channel estimation between UEs, it is preferable to use the same data piece size. The eNB applies interleaving to the aggregated data 503 as indicated by reference numeral 505. Here, any interleaving operation usable in the LTE system such as block or Quadratic Permutation Polynomial (QPP) interleaving is used. The interleaved data 507 is mapped to a PRB 509 in a frequency first manner for transmission. Allocation of interleaved data is notified using the same control channel schemes described in relation to FIG. 4.

Figure 6:
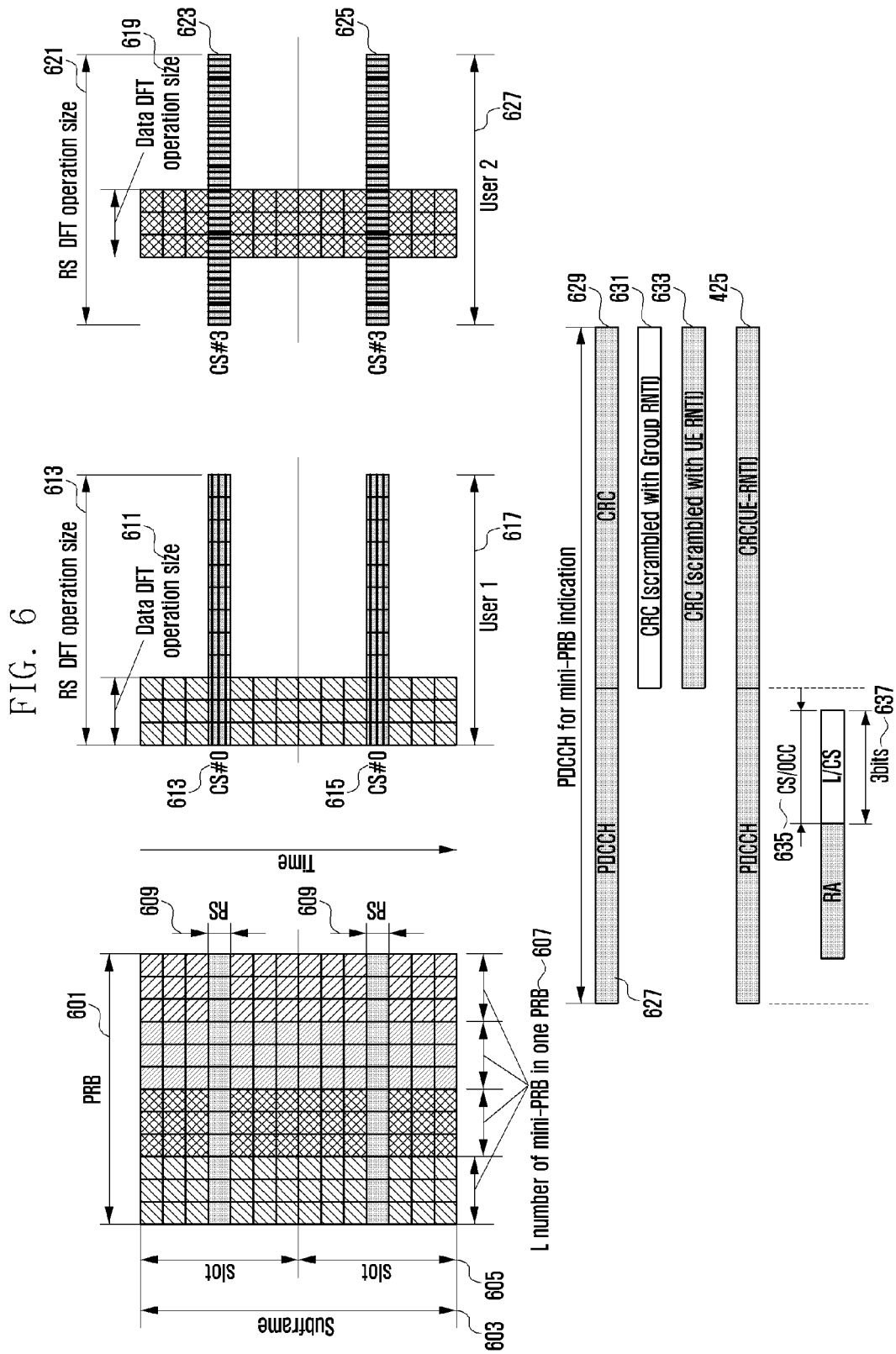
FIG. 6 is a diagram illustrating an uplink resource allocation structure and control channel according to an embodiment of the present invention.

FIG. 6 is a diagram illustrating uplink data channel transmission using mini-PRBs according to an embodiment of the present invention.

In uplink transmission, the bandwidth of a data channel is narrower than that of a reference signal. For different users, reference signals are the same in location and sequence but different in cyclic shift value. The data channel is transmitted using orthogonal frequency resources. Such uplink transmission is described with reference to FIG. 5.

Similarly to downlink transmission depicted in FIG. 4, a PRB 601 for a data channel in the uplink is divided into L mini-PRBs as indicated by reference numeral 607.

However, in handling of reference signals, there is a great difference between the uplink and the downlink. In the downlink, a UE reads a reference signal and identify the channel destined thereto. In the uplink, UEs using mini-PRBs 607 belonging to one PRB 601 have to use a reference signal 609 with a fixed length and location in the PRB. If the reference signal were divided into L parts because of division of one PRB into L mini-PRBs, a UE would require a new reference signal, and it would be difficult to separate channels of different UEs using the same reference signal because the sequence length of the reference signal is too short.

In consideration of this, to enable channel separation between different UEs, the UEs cyclic-shift reference signals to maintain orthogonality between UEs and send the cyclic-shifted reference signals 609 of the same width at the same location. In addition, the UEs send data channels having bandwidths less than those of the corresponding reference signals so that orthogonality is maintained in the frequency domain.

For example, when a first user 617 and a second user 627 send using the same PRB, data channels for the first user 617 and second user 627 are configured to use the same Discrete Fourier Transform (DFT) operation size of 2 as indicated by reference numerals 611 and 619 and to use different frequency ranges in the PRB. Reference signals for the first user 617 and second user 627 are configured to have the same DFT operation size as indicated by reference numerals 613 and 621, to be arranged at the same locations in the first and second slots, but to be shifted respectively by cyclic shift 0 and cyclic shift 3 as indicated by reference numerals 623 and 625. Use of cyclic-shifted reference signals enables the eNB to separate channels.

A control channel 629 supporting the above resource allocation scheme is described below.

According to an embodiment of the present invention, the CRC part of the control channel is scrambled with a group identifier for transmission as indicated by reference numerals 631. Here, MTC UEs are classified into multiple groups, and group identifiers are assigned to the groups. The eNB notifies subframe location and period, PRB location, mini-PRB location, and cyclic shift value for a reference signal to a UE through higher layer signaling, and scrambles the CRC part of the control channel with a group identifier and transmits the control channel so that the UE receives the control channel using the group identifier. After reception of the control channel using the group identifier, the UE sends data using information indicated by higher layer signaling. This approach makes it possible to perform data scheduling without increasing control channel resources, similarly to the case of the downlink.

According to an embodiment of the present invention, the existing control channel is used. The control channel contains a Cyclic Shift/Orthogonal Cover Code (CS/OCC) field 635 of 3 bits, which is used for control channel transmission in the uplink. In an MTC UE, L/CS information (L for mini-PRB information and CS for cyclic shift information related to the reference signal) is inserted in the CS/OCC field 635. Table 2 illustrates interpretation of such 3-bit information 637. As this approach reuses an existing 3-bit field of the control channel, it is unnecessary to change the size of the control channel.

TABLE 2

L, CS indication

| L/CS indication | CS# | L |
|---|---|---|
| 0 | 0 | 0 |
| 1 | 2 | 0 |
| 2 | 3 | 1 |
| 3 | 4 | 1 |
| 4 | 6 | 2 |
| 5 | 8 | 2 |
| 6 | 9 | 3 |
| 7 | 10 | 3 |

Figure 7:
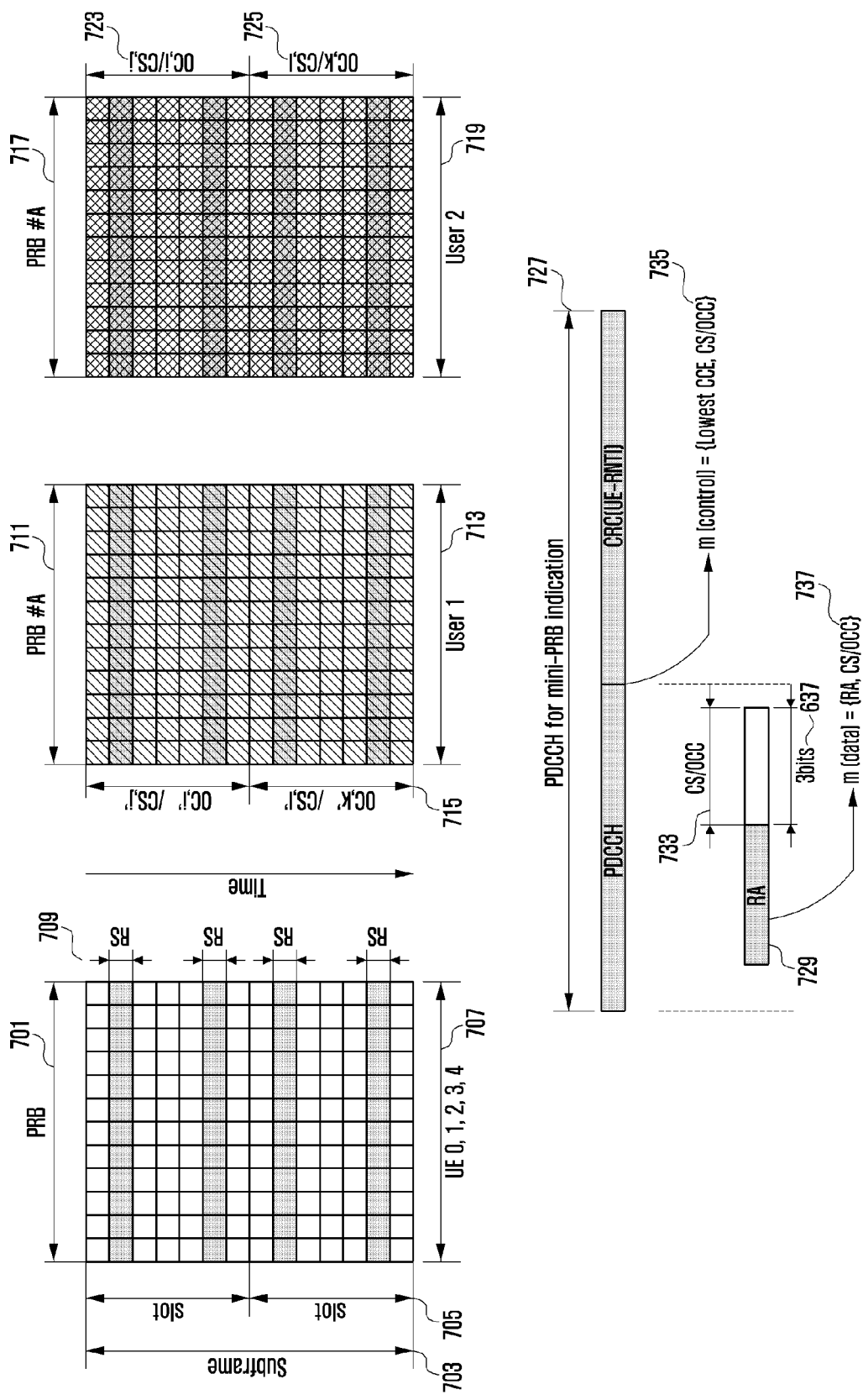
FIG. 7 is a diagram illustrating an uplink resource allocation structure and control channel according to an embodiment of the present invention.

FIG. 7 is a diagram illustrating multiplexing of UEs using the same resources through codes ensuring orthogonality between data channels using the same resources.

Here, format 3, which is used to transmit a control channel with a large payload size in the LTE system, is used. Specifically, format 1 and format 2 are used to send control information to a UE, and format 3 is used to send data information to a UE. In the related art, formats are selected according to the size of control information to be transmitted. According to an aspect of the present invention, formats are selected according to the type of information. Use of format 3 enables up to five UEs to send the same PRB, but permits transmission of information of up to 25 bits.

According to an embodiment of the present invention, an MTC UE uses format 1/2 for uplink control channel transmission, and uses format 3 for uplink data channel transmission. Whereas formats are determined according to the payload size of the control channel in the existing LTE system, formats are determined according to the type of payload, according to an aspect of the present invention. For each of five UEs, there are five data symbols and two RS symbols in each of slots 723 and 725. The five data symbols are multiplexed using orthogonal sequences illustrated in Table 3, and cyclic shift values notified by the eNB are applied to reference signals. As five UEs are multiplexed, up to five combinations are possible. In the downlink control channel, a 3-bit field 733 defined by format 3 is used to transmit resource allocation information 731 for data channel transmission. Interpretation of this information is illustrated in Table 4. Resources are allocated using information contained in the Resource Allocation (RA) field of the downlink control channel.

TABLE 3

| Orthogonal cover | |
|---|---|
| Index | OC |
| 0 | $[1\ 1\ 1\ 1\ 1]$ |
| 1 | $[1\ e^{j2\pi/5}\ e^{j4\pi/5}\ e^{j6\pi/5}\ e^{j8\pi/5}]$ |
| 2 | $[1\ e^{j4\pi/5}\ e^{j8\pi/5}\ e^{j2\pi/5}\ e^{j6\pi/5}]$ |
| 3 | $[1\ e^{j6\pi/5}\ e^{j2\pi/5}\ e^{j8\pi/5}\ e^{j4\pi/5}]$ |
| 4 | $[1\ e^{j8\pi/5}\ e^{j6\pi/5}\ e^{j4\pi/5}\ e^{j2\pi/5}]$ |

TABLE 4

| OC, CS indication | | | | |
|---|---|---|---|---|
| | 1$^{st}$ slot | | 2$^{nd}$ slot | |
| Index | OC | CS | OC | CS |
| 0 | 0 | 0 | 0 | 0 |
| 1 | 1 | 3 | 3 | 8 |
| 2 | 2 | 6 | 1 | 3 |
| 3 | 3 | 8 | 4 | 10 |
| 4 | 4 | 10 | 2 | 6 |

For example, assuming that the same PRB 711 is used by two users 713 and 719, when the eNB assigns index 0 of Table 4 to the first user and assigns index 1 to the second user, for the first user, OC #0 and cyclic shift #0 are applied at the first and second slots, and for the second user, OC#1 and CS #3 are applied at the first slot and OC #3 and CS #8 are applied at the second slot. In this manner, the eNB schedules up to five users using one PRB. Hence, the eNB receives data of up to 20 users through a bandwidth consisting of 4 data PRBs. For control channel transmission, the 3-bit CS/OCC field in control channel information for uplink scheduling is reused as indicated by reference numeral 727. Originally, the CS/OCC information is used to notify control channel resources for uplink transmission. This information is also used for data transmission. Hence, to send control information, a UE performs control channel transmission using a control channel resource index and CS/OCC information as indicated by reference numeral 735. For data channel transmission, the UE sets the RA field so that the RA field identifies data region resources using notified PRB allocation information and CS/OCC information as indicated by reference numeral 737.

Figure 8:
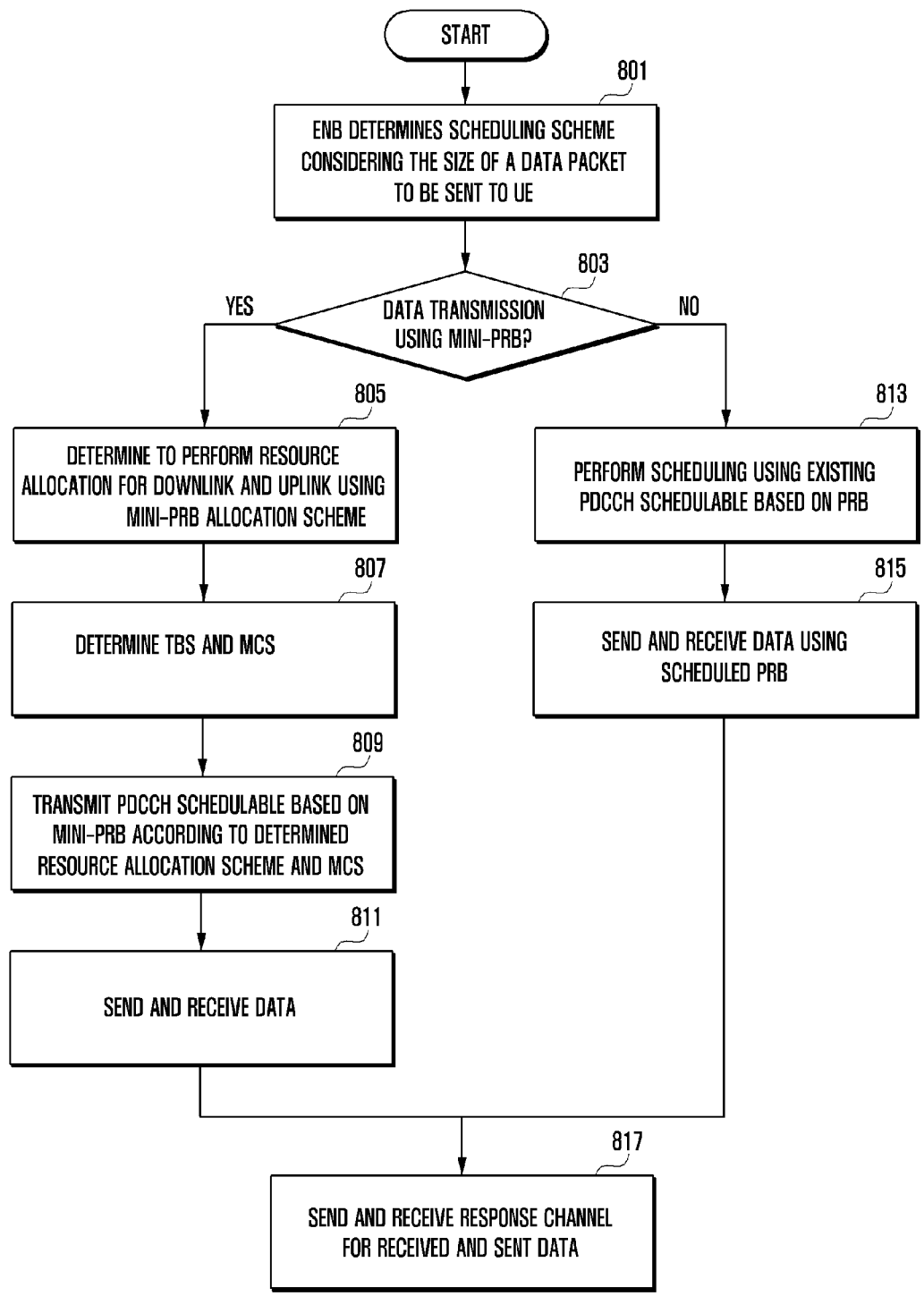
FIG. 8 is a flowchart of a transmission procedure performed by a base station according to an embodiment of the present invention.

FIG. 8 is a flowchart of a transmission procedure for an eNB according to an embodiment of the present invention.

The resource allocation procedure performed by the eNB for downlink transmission includes transmitting a control channel containing downlink resource allocation information, and transmitting a data channel configured according to the resource allocation information. Here, the control channel contains resource allocation information for at least two UEs, which is related to a resource block divisible into at least two resource groups.

The resource allocation procedure performed by the eNB for uplink transmission includes transmitting control information containing uplink resource allocation information, and receiving a data channel configured according to the uplink resource allocation information. Here, the control information contains uplink resource allocation information for at least two UEs, which is related to a resource block divisible into at least two resource groups.

A procedure for resource allocation and notification is described below with reference to FIG. 8.

The eNB examines the size of a data packet to be sent to a UE to determine a scheduling scheme, in Step 801. Here, the eNB is assumed to be aware that an MTC device generates a very small data packet. Hence, step 801 is comparable to checking whether the data packet is sent to an MTC device (or MTC UE).

The eNB checks whether it is necessary to transmit the data packet using a mini-PRB, in Step 803. In other words, the eNB determines whether a PRB is divisible into two or more mini-PRBs and resource allocation for at least two UEs is possible in the PRB. When it is necessary to transmit the data packet using a mini-PRB, the eNB performs resource allocation for the downlink and uplink using the described mini-PRB allocation scheme, in Step 805. Mini-PRB allocation has been described in detail in connection with FIGS. 3 to 7, and a description thereof is omitted.

The eNB determines Transport Block Size (TBS) and MCS in consideration of channel states of the UE, in Step 807. The eNB notifies mini-PRB information and MCS information through a control channel using a control channel notification scheme, in Step 809. Here, determination results at steps 805 and 807 are transmitted through higher layer signaling and control channel transmission are performed using CRC scrambled with a group identifier such as group RNTI, or determination results at Steps 805 and 807 are transmitted through a control channel using CRC scrambled with UE-RNTI.

As described above, control channel transmission using CRC scrambled with a group identifier accommodates a large number of MTC UEs without increasing the control channel size. Further, as most MTC UEs have a long transmission period, impact of data transmission on the system is minimized. The eNB sends downlink data or receives uplink data according to the scheduling information, in Step 811. When it is not necessary to transmit the data packet using a mini-PRB at Step 803, the eNB performs scheduling using a PRB, in Step 813, and sends the data packet as scheduled, in Step 815.

Figure 9:
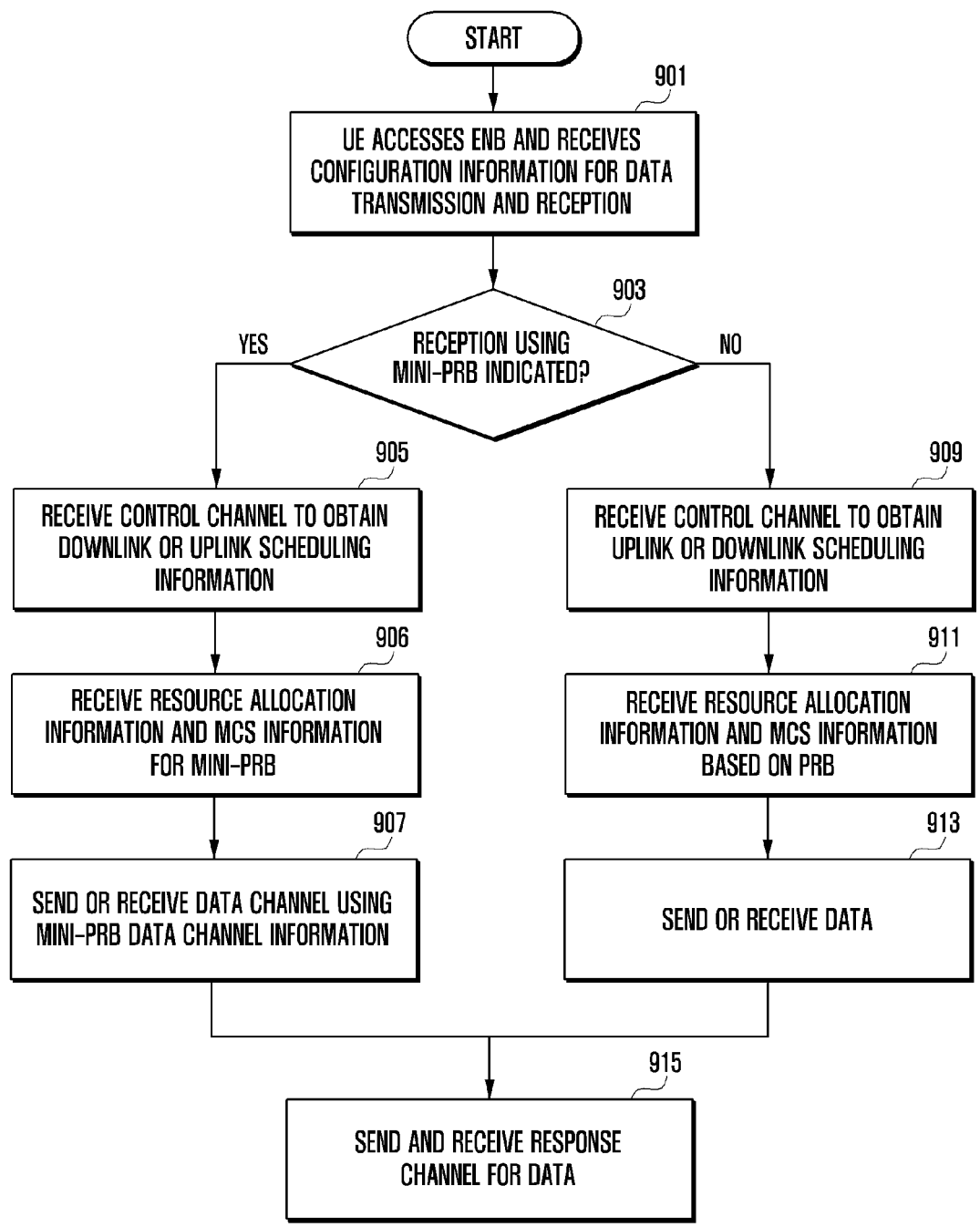
FIG. 9 is a flowchart of a reception procedure performed by a user equipment according to an embodiment of the present invention.

FIG. 9 is a flowchart of a reception procedure for a UE according to an embodiment of the present invention.

The procedure for receiving downlink resource allocation information performed by a UE includes receiving a control channel containing downlink resource allocation information from an eNB, and receiving a data channel configured according to the downlink resource allocation information from the eNB. Here, the control channel contains resource allocation information for at least two UEs, which is related to a resource block divisible into at least two resource groups.

The uplink transmission procedure for a UE includes receiving control information containing uplink resource allocation information from an eNB, and transmitting a data channel configured according to the uplink resource allocation information. Here, the control information contains uplink resource allocation information for at least two UEs, which is related to a resource block divisible into at least two resource groups.

The procedure performed by a UE is described with reference to FIG. 9. The UE accesses the eNB and receives configuration information for data transmission and reception, in Step 901. At step 901, the UE receives higher layer signaling for system information and data. Reception of configuration information causes the eNB to check necessity of using a mini-PRB for small data transmission and to notify a transmission scheme to be used.

The UE determines whether the configured transmission scheme uses a PRB or a mini-PRB, in Step 903. When the configured transmission scheme uses a mini-PRB, the UE receives a control channel from the eNB to obtain downlink or uplink scheduling information, in Step 905. The UE receives resource allocation information and MCS information based on the received control channel information and a notification scheme for mini-PRB allocation, in Step 906.

The UE sends or receives a data channel using the received information, in Step 907. When the configured transmission scheme uses a PRB at step 903, the UE receives a control channel to obtain scheduling information in units of PRB, in Step 909, receives resource allocation information and MCS information based on PRB, in Step 911, and sends or receives a data channel using the received information, in Step 913. After sending or receiving a data channel at step 907 or 913, the UE sends or receives a response channel in return to data channel reception or transmission, in Step 915.

Figure 10:
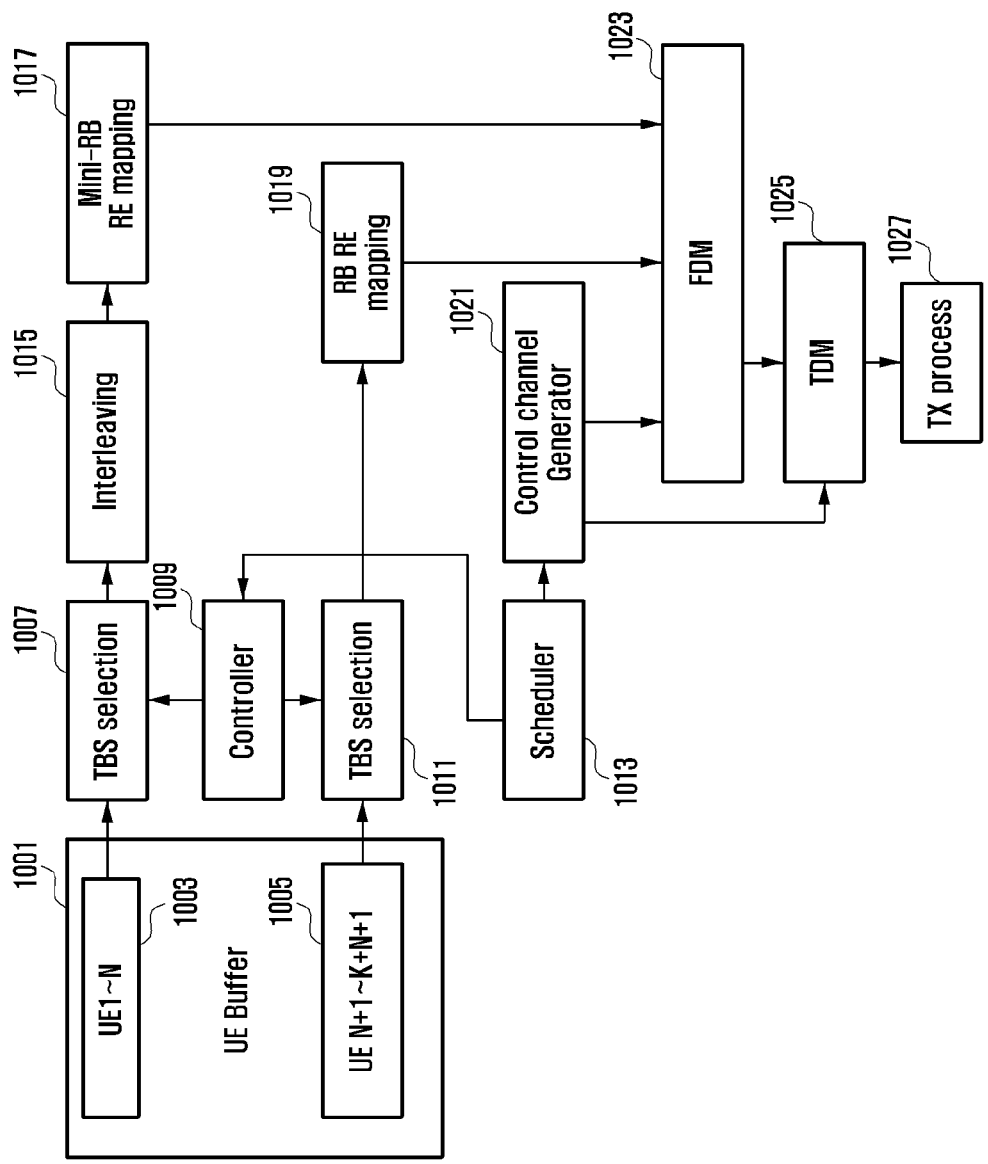
FIG. 10 is a block diagram illustrating a transmission apparatus of a base station according to an embodiment of the present invention.

FIG. 10 is a block diagram illustrating a transmission apparatus of the eNB according to an embodiment of the present invention.

In the transmission apparatus of the eNB, for data transmission, the scheduler 1013 uses the controller 1009 to classify individual UEs into a group of UEs 1003 suitable for mini-PRB based scheduling and another group of UEs 1005 suitable for PRB based scheduling in consideration of status of the UE buffer 1001 and intended services.

For a UE suitable for mini-PRB based transmission, the controller 1009 controls the TBS selector 1007 for a mini-PRB to determine the transport data size and transmission rate according to the amount of data to be sent and channel states of the UE. If necessary, the controller 1009 controls the interleaver 1015 to perform interleaving on mini-PRBs or TBs of multiple UEs. Interleaving is skipped depending upon UE channel status.

Thereafter, the controller 1009 controls the resource allocator (or resource mapper) 1017 to map UE data on scheduled locations of a mini-PRB. For a UE 1005 suitable for PRB based scheduling, the TBS selector 1011 determines the transport data size and transmission rate, and the resource allocator 1019 maps UE data on scheduled locations of a PRB.

The scheduler 1013 configures a control channel for PRB and a control channel for mini-PRB. The FDM 1023 multiplexes control channel for mini-PRB, data channel for PRB and data channel for mini-PRB in the frequency domain. The Time-Division Multiplexer (TDM) multiplexes control channel for PRB, control channel for mini-PRB and other multiplexed data channel signal in a time-first manner in the time domain. The multiplexed signal is transmitted through the transceiver 1027 to UEs.

Figure 11:
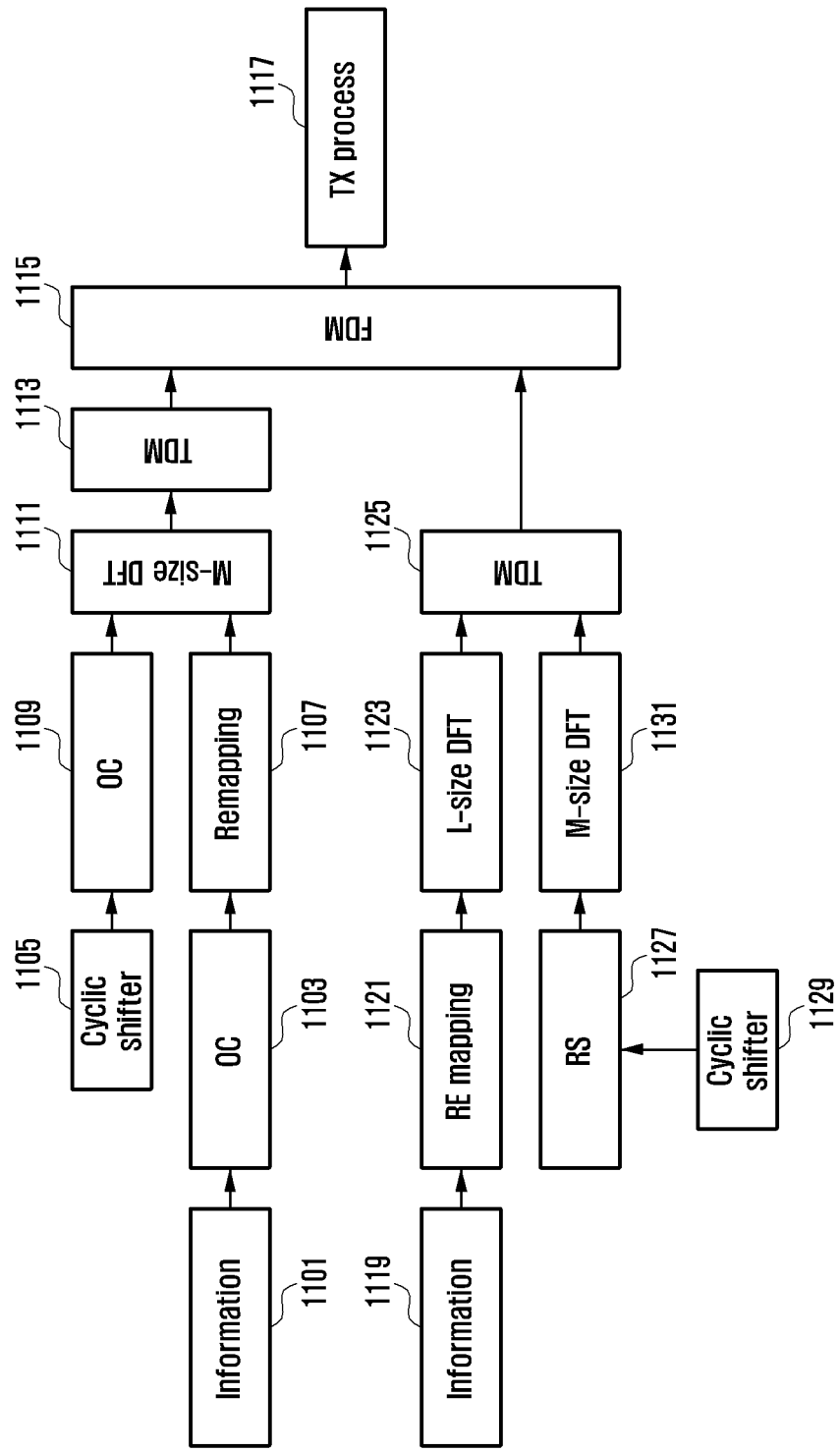
FIG. 11 is a block diagram illustrating a reception apparatus of a user equipment according to an embodiment of the present invention.

FIG. 11 is a block diagram illustrating a reception apparatus of user equipment according to an embodiment of the present invention. To schedule more UEs using the same amount of resources, when the amount of data to be sent is small, the reception apparatus sends data using a mini-PRB or send data through a control channel. Data or information 1119 to be sent using mini-PRB is mapped by the resource mapper 1121 to resources of a size L (mini-PRB size in the frequency domain) using scheduling information. The L-size DFT 1123 applies DFT operation of a size L to the mapped data. The M-size DFT 1131 applies DFT operation of a size M (PRB size in the frequency domain) to a reference signal 1127. To enable multiple UEs to share the same PRB, the cyclic shifter 1129 applies cyclic shift operation to the reference signal. Different cyclic shift values (notified by the eNB) are used for different UEs using the same reference signal. Thereafter, the data and reference signal are multiplexed by the TDM 1125 in suitable arrangement, and the multiplexed signal is sent through the transceiver 1117 to the eNB. In another scheme, information 1101 is sent through an existing control channel or through a data channel using PUCCH format 3. A data signal is generated by applying OC values 1103 to the information 1101, and a reference signal 1109 is generated using the cyclic shifter 1105, where OC values and cyclic shift values are sent by the eNB through a control channel to the UE. The M-size DFT 111 applies DFT operation to the data signal and reference signal. Thereafter, the transformed data signal and reference signal are multiplexed by the TDM 1113, and the multiplexed signal is sent through the TX process 1117 to the eNB. Here, the control channel is transmitted using existing PUCCH format 1 or 2, and the data channel is transmitted using PUCCH format 3. This scheme enables five users to simultaneously send using one PRB, and hence achieves a five-fold increase in the number of UEs.

According to an aspect of the present invention, the method and apparatus for resource allocation enables resource efficient allocation for transmitting small data packets on resource units of time-frequency resource blocks in wireless OFDM communication. By allocating data from multiple user equipments on a single resource block, it is possible to schedule a greater number of user equipments while maintaining compatibility with the resource allocation scheme of legacy user equipments. As multiple user equipments are scheduled using a single control channel, resource efficiency of the control channel is increased. In addition, it is possible to provide a data channel configuration free of interference between user equipments using the same resource blocks in the uplink and downlink.

Although various embodiments of the present invention have been described in detail herein, it will be apparent to those of ordinary skill in the art that variations and modifications may be made without departing from the spirit and scope of the present invention, as defined by the appended claims.

What is claimed is:

1. A resource allocation method for a base station supporting multiple user equipments (UEs) in a wireless communication system, the method comprising: transmitting, to a UE, configuration information which contains a group identifier of a UE group to which the UE belongs;
   transmitting, to the UE, downlink resource allocation information for the UE group on a control channel, the downlink resource allocation information comprising location information of a first type Physical Resource Block (PRB) allocated to the UE group; and
   transmitting, to the UE, data allocated in the first type PRB according to the downlink resource allocation information on a data channel,
   wherein the downlink resource allocation information further comprises an indicator indicating whether the downlink resource allocation information is in units of PRB or in units of the first type PRB, and
   wherein a modulation and coding scheme (MCS) field in the downlink resource allocation information comprises 3 bits corresponding to the location information and 2 bits corresponding to MCS information, and
   wherein at least two first type PRBs comprise one PRB.

2. The resource allocation method of claim 1, wherein transmitting the downlink resource allocation information further comprises:
   scrambling the downlink resource allocation information based on the group identifier.

3. The resource allocation method of claim 1, further comprising: receiving uplink data and an uplink reference signal from the UE, and
   wherein an uplink data resource is an uplink first type PRB in an uplink PRB divided into at least two uplink first type PRBs, and wherein a bandwidth of the uplink data resource is narrower than that of the uplink reference signal.

4. The resource allocation method of claim 3, wherein different cyclic shift values for different UEs are applied to the uplink reference signal.

5. A method of receiving resource allocation information for a user equipment (UE) in a wireless communication system, the method comprising:
   receiving, from a base station, configuration information which contains a group identifier of a UE group to which the UE belongs;
   receiving, from the base station, downlink resource allocation information for the UE group on a control channel, the downlink resource allocation information comprising location information of a first type Physical Resource Block (PRB) allocated to the UE group; and
   receiving, from the base station, a data allocated in the first type PRB according to the downlink resource allocation information on a data channel,
   wherein the downlink resource allocation information further comprises an indicator indicating whether the downlink resource allocation information is in units of PRB or in units of the first type PRB,
   wherein a modulation and coding scheme (MCS) field in the downlink resource allocation information comprises 3 bits corresponding to the location information and 2 bits corresponding to MCS information, and
   wherein at least two first type PRBs comprise one PRB.

6. The method of claim 5, wherein receiving the downlink resource allocation information further comprises:
   checking whether the received downlink resource allocation information passes a Cyclic Redundancy Check (CRC) test based on the group identifier received from the base station.

7. The method of claim 5, further comprising transmitting an uplink data and an uplink reference signal to the base station, and
   wherein an uplink data resource is an uplink first type PRB divided into at least two uplink first type PRBs, and wherein a bandwidth of the uplink data resource is narrower than that of an uplink reference signal.

8. The method of claim 7, wherein different cyclic shift values for different UEs are applied to the uplink reference signal.

9. A base station for allocating resources to multiple user equipments (UEs) in a wireless communication system, comprising:
   a transceiver configured to send and receive signals to and from a UE; and
   a controller configured to control to transmit, to the UE, configuration information, which contains a group identifier of a UE group to which a UE belongs, to transmit, to the UE, downlink resource allocation information for the UE group on a control channel, the downlink resource allocation information comprising location information of a first type Physical Resource Block (PRB) allocated to the UE group, and to transmit, to the UE, data allocated in the first type PRB according to the downlink resource allocation information on a data channel,
   wherein the downlink resource allocation information further comprises an indicator indicating whether the downlink resource allocation information is in units of PRB or in units of the first type PRB,
   wherein a modulation and coding scheme (MCS) field in the downlink resource allocation information comprises 3 bits corresponding to the location information and 2 bits corresponding to MCS information, and
   wherein at least two first type PRBs comprise one PRB.

10. The base station of claim 9, wherein the controller is configured to scrambles the downlink resource allocation information based on the group identifier.

11. The base station of claim 9, wherein the controller is further configured to receive an uplink data and an uplink reference signal from the UE, and
   wherein an uplink data resource is an uplink first type PRB in an uplink PRB divided into at least two uplink first type PRBs, and wherein a bandwidth of the uplink data resource is narrower than that of the uplink reference signal.

12. The base station of claim 11, wherein different cyclic shift values for different UEs are applied to the uplink reference signal.

13. A user equipment (UE) for receiving resource allocation information in a wireless communication system, comprising:
   a transceiver is configured to send and receive signals to and from a base station; and
   a controller configured to control to receive, from the base station, configuration information which contains a group identifier of a UE group to which the UE belongs, to receive, from the base station, downlink resource allocation information for the UE group on a control channel, the downlink resource allocation information comprising location information of a first type Physical Resource Block (PRB) allocated to the UE group, and to receive, from the base station, data allocated in the first type PRB according to the downlink resource allocation information on a data channel, wherein the downlink resource allocation information further comprises an indicator indicating whether the downlink resource allocation information is in units of PRB or in units of the first type PRB, wherein a modulation and coding scheme (MCS) field in the downlink resource allocation information comprises 3 bits corresponding to the location information and 2 bits corresponding to MCS information, and wherein at least two first type PRBs comprise one PRB.

14. The user equipment of claim 13, wherein the controller checks whether the received downlink resource allocation information passes a Cyclic Redundancy Check (CRC) test based on the group identifier received from the base station.

15. The user equipment of claim 13, wherein the controller further configured to control transmitting an uplink data and an uplink reference signal to the base station, and wherein the uplink data resource is an uplink first type PRB in an uplink PRB divided into at least two uplink first type PRBs and wherein a bandwidth of the uplink data resource is narrower than that of an uplink reference signal.

16. The user equipment of claim 15, wherein different cyclic shift values for different UEs are applied to the uplink reference signal.

\* \* \* \* \*